Patented Aug. 22, 1939

2,170,209

UNITED STATES PATENT OFFICE 2,170,209

SULPHONAMIDES OF 2-AMINOPYRIDINES

Carl Naegeli, Zurich, Switzerland, assignor to Cilag, Chemisches Industrielles Laboratorium A. G., Shaffhausen, Switzerland No Drawing. Application March 22, 1938, Serial No. 197,360. In Switzerland November 24, 1937

5 Claims. (Cl. 260—296)

This invention relates to compounds useful as medicines and to processes for their manufacture. It is more particularly directed to a class of compounds having bactericidal action against various forms of bacteria; and processes for their manufacture.

The object of this invention is to produce a series of compounds, having a wide range of usefulness in destroying bacteria, and which possess marked therapeutic value in the treatment of various infections of the body; and to provide a simple, easily-practised process for the production of such compounds.

The invention comprises as a new material a series of non-poisonous compounds, having a bactericidal character, obtained by introducing the sulphonamide group into aminopyridines. The compositions comprised herein are more specifically defined hereinafter.

In accordance with the present invention, I have found that the sulphonamides of 2-aminopyridines, which may be expressed by the formula:

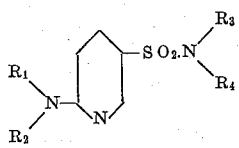

where $R_1$, $R_2$, $R_3$, $R_4$ may be alkyl-, aryl-, aralkyl- or heterocyclic groups as well as acyl radicals, are relatively non-toxic, while possessing specific bactericidal action, and they must be regarded as a new and characteristic, as well as most valuable order of medical preparations, efficacious in infectious diseases, propagated by various microbes, and particularly by the cocci type.

It will be noted that the sulphonamides of α-aminopyridine are related to the 4-aminobenzene-sulphonamides which in the past years have become foremost in the treatment of infectious diseases, especially of the streptococci type.

The members of the aminopyridine-sulphonamide group can be administered either as such or in form of their salts with inorganic or organic acids orally and some of them subcutaneously, intramuscularly and intravenously.

The following are preferred processes for manufacturing a few compositions in accordance with the invention:

1. 50 grammes of 2-chloropyridine-5-sulphonamide and 300 ccm. of concentrated ammonia are heated together in an autoclave during 3 hours at a temperature of 130–150° C. The resulting solution is concentrated. On cooling the 2-aminopyridine-5-sulphonamide crystallizes in colorless prisms. This purification of said substance is practically achieved by recrystallization from hot water. M. P. 175–176° C. The substance is readily soluble in hot water and an approximately ½% stable aqueous solution of the preparation can be obtained at 15° C. It is readily soluble in diluted acids, alkali and alcohol, little soluble in hydrocarbons.

2. 5 grammes of 2-chloropyridine-5-sulphonamide and 15 grammes of a 33% aqueous solution ethylamine are heated together during 4 hours in a pressure bottle at 100° C. The resulting 2-ethylamino-pyridine-5-sulphonamide is crystallized preferably from hot water. M. P. 189–191° C. The colourless substance is readily soluble in diluted hydrochloric acid as well as in weak alkali, less soluble in water, benzene and ether.

3. 5 grammes of 2-chloropyridine-5-sulphonamide and 3.8 grammes of butylamine (2 mols.) are heated for 4 hours at the reflux condenser. To the resulting viscous oily material water is added, whereof the 2-butylamino-pyridine-5-sulphonamide crystallizes. It is purified by recrystallization from water. M. P. 121–122° C. It is soluble in diluted hydrochloric acid and alkali, very soluble in alcohol and acetone, very little soluble in ether and cold water.

4. 5 grammes of 2-chloropyridine-5-sulphonamide and 2.7 grammes allylamine are heated in an autoclave during 6 hours at a temperature of 125–130° C. The viscous oil is poured into water, whereby the 2-allylamino-pyridine-5-sulphonamide solidifies. M. P. 195–201° C. The substance is easily soluble in hydrochloric acid and alkali, also in acetone. It is less soluble in alcohol, water, benzene and ether. In hot water it is readily soluble.

5. 3 grammes of 2-chloropyridine-5-sulphonamide, 4.35 grammes aniline and 10 ccm. water are heated in an autoclave during 6 hours at a temperature of 100–115° C. The resulting crystals of 2-phenylamino-pyridine-5-sulphonamide have a M. P. of 181–183° C. and are readily soluble in diluted hydrochloric acid and in acetone. They are also very soluble in hot diluted alkali and alcohol, but very little soluble in water, benzene and ether.

6. 500 grammes of 2-chloropyridine-5-sulphonamide and 550 grammes of benzylamine are refluxed during half an hour. After cooling the 2-benzylamino-pyridine-5-sulphonamide crystallizes and is purified by recrystallization from hot water. M. P. 197–201° C. The colourless substance dissolves easily in diluted alkali, boiling acetone and hot diluted hydrochloric acid, very little in water, alcohol, benzene and ether.

7. 3 grammes of 2-chloropyridine-5-sulphonamide and 3.42 grammes of diethylamine are heated in a pressure bottle during 6 hours at a temperature of 110–115° C. The resulting 2-diethylamino-pyridine-5-sulphonamide is recrystallized from hot water. M. P. 116–117° C. The substance is easily soluble in diluted alkali, acetone and also in hot diluted hydrochloric acid as well as in hot alcohol, not soluble in ether.

8. 30 grammes of 2-chloropyridine - 5 - sulphochloride are dissolved in 25 ccm. benzene and to the solution 29 grammes of aniline are added. After the reaction has subsided, the benzene is removed and the resulting 2-chloropyridine-5-sulphoanilide freed from the excess of aniline by washing with dilute hydrochloric acid. It is recrystallized from alcohol; colourless plates, having a M. P. of 149–151° C.

15 grammes of this 2-chloropyridine-5-sulphonanilide are heated with 50 ccm. of 25% ammonia during 4 hours at a temperature of 130–140° C. After removing the ammonia the 2-aminopyridene-5-sulphoanilide precipitates and is recrystallized from hot water. M. P. 177–178.5° C. The colourless crystals dissolve easily in dilute hydrochloric acid and alkali as well as in alcohol and acetone; it is less soluble in water, benzene and ether.

9. 5 grammes 2-chloropyridine-5-sulphochloride and 25.5 grammes of a 33% aqueous solution of ethylamine are heated during 4 hours at a temperature of 135–150° C. in an autoclave. The precipitated 2-ethylamino-pyridine-5-ethylsulphonamide is crystallized from hot water. M. P. 139–141° C. Colourless crystals; soluble in alcohol, acetone, hot alkali and hydrochloric acid, little soluble in hot water and boiling ether.

10. 20 grammes of 2-aminopyridine-5-sulphonamide are dissolved in 70 grammes pyridine and to this solution 48.7 grammes (3 mols.) benzoylchloride are slowly added under cooling and stirring during 3 hours. The reaction mixture is heated on a sand-bath for 1½ hours and the pyridine is removed by vacuum distillation. The residue is diluted with water and the precipitate filtered off, washed with water and diluted hydrochloric acid and recrystallized from alcohol. The 2-benzoylaminopyridine-5-sulphonylbenzoylamide is a colourless substance, having a M. P. of 221–223° C.; it is soluble in diluted alkali and acetone, less soluble in alcohol, very little soluble in warm and cold water and diluted hydrochloric acid.

11. 20 grammes 2-chloropyridine-5-sulphonamide and 22 grammes 2.6-diaminopyridine are heated for 4 hours with a small quantity of water in a sealed tube at a temperature of 110° C. The resulting substance consists of a mixture of 2-[2′aminopyridyl-(6′)]-aminopyridine-5-sulphonamide and of pyridyl-(2′.6′)-bis[-2-aminopyridine-5-sulphonamide].

As many apparently widely different embodiments of this invention may be made without departing from the spirit thereof, it will be understood that I do not intend to limit myself to the specific embodiment herein set forth, except as indicated in the appended claims. By "aryl"- "aralkyl"- and "heterocyclic" groups is meant any group whose ring can contain any radical, such as carboxylic, sulphonic, sulphonamide, arsonic, nitril, nitro groups, iodine, hydroxy, amino groups and the like.

I claim:

1. A medicinal preparation including a substance non-toxic in approved dosage having the general formula

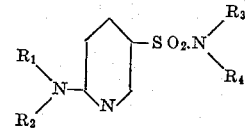

in which $R_1$, $R_2$, $R_3$, $R_4$, are radicals of the class consisting of hydrogen, alkyl-, aryl-, aralkyl-, heterocyclic- and acyl-groups, prepared for use in the treatment of germ infections.

2. As a medicinal substance 2-aminopyridine-5-sulphonamide of the M. P. 175–176° C., soluble in water to form an approximately ½% solution at 15° C., prepared for use in the treatment of germ infections.

3. As a medicinal substance 2-benzylaminopyridine-5-sulphonamide of the M. P. 197–201° C., prepared for use in the treatment of germ infections.

4. As a medicinal substance 2-ethylamino-pyridine-5-ethylsulphonamide of the M. P. 139–141° C., prepared for use in the treatment of germ infections.

5. A process for producing a medicinal substance for use in the treatment of germ infections, which comprises heating 2-chloropyridine-5-sulphonamide with ammonia, whereby the chlorine atom is substituted by the amino group, and purifying to remove the harmful by-products.

CARL NAEGELI.